INVENTORS
ALEX GRADOFF
KENNETH W. HOWELL
IVAN VINOFF
BY
George B White
ATTORNEY

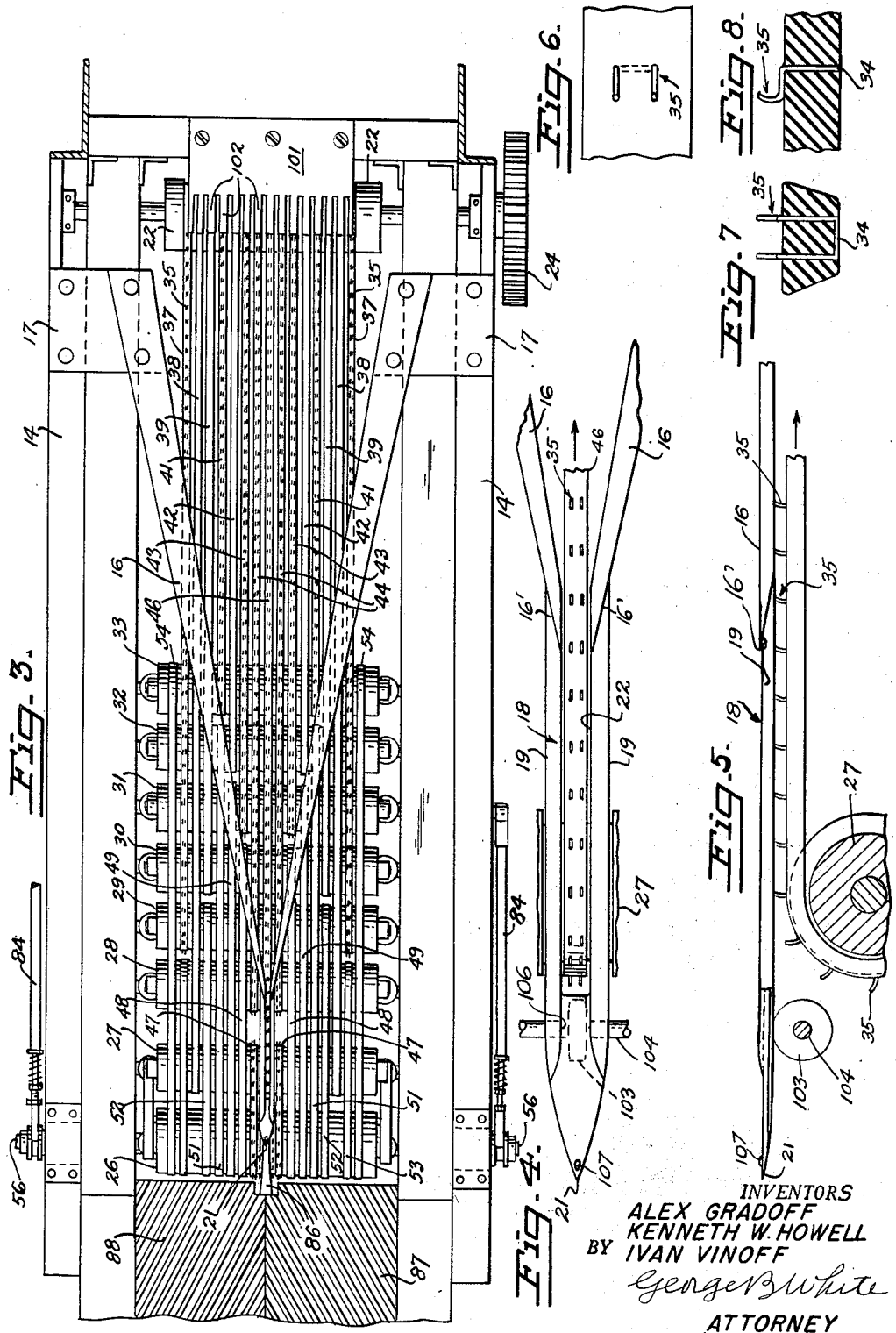

Feb. 11, 1958 A. GRADOFF ET AL 2,822,569
FISH FILLETING MACHINE
Filed Nov. 8, 1954 6 Sheets-Sheet 4

INVENTORS
ALEX GRADOFF
KENNETH W. HOWELL
BY IVAN VINOFF
George B White
ATTORNEY

Feb. 11, 1958  A. GRADOFF ET AL  2,822,569
FISH FILLETING MACHINE
Filed Nov. 8, 1954  6 Sheets-Sheet 5
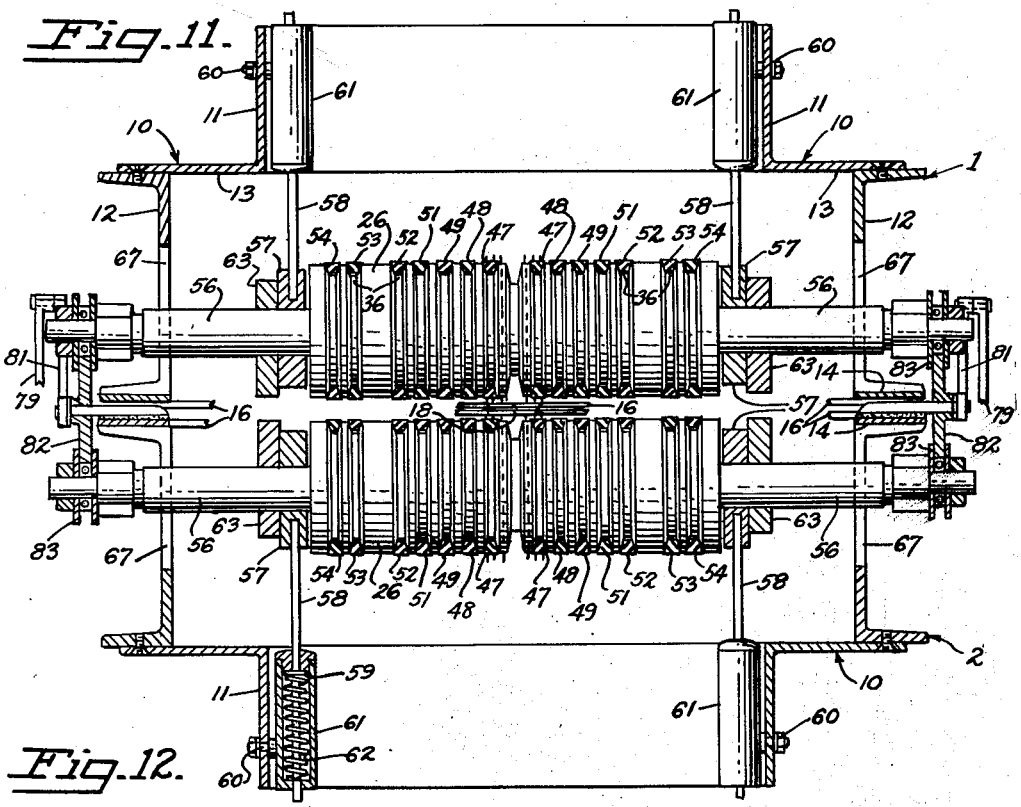
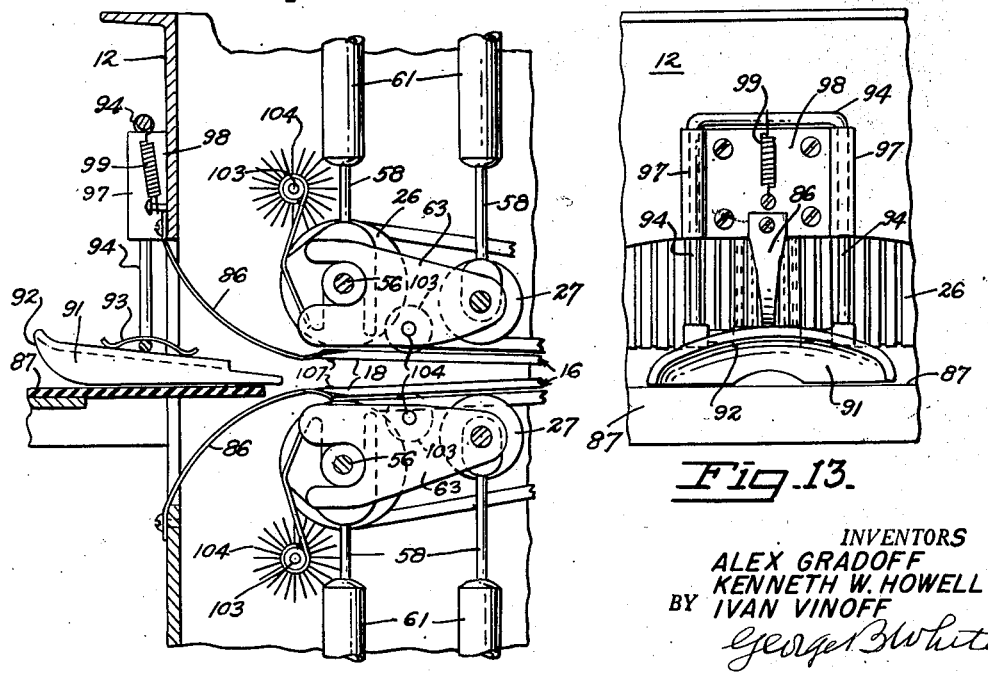
INVENTORS
ALEX GRADOFF
KENNETH W. HOWELL
BY IVAN VINOFF
George B. White
ATTORNEY Feb. 11, 1958     A. GRADOFF ET AL     2,822,569
FISH FILLETING MACHINE
Filed Nov. 8, 1954     6 Sheets-Sheet 6
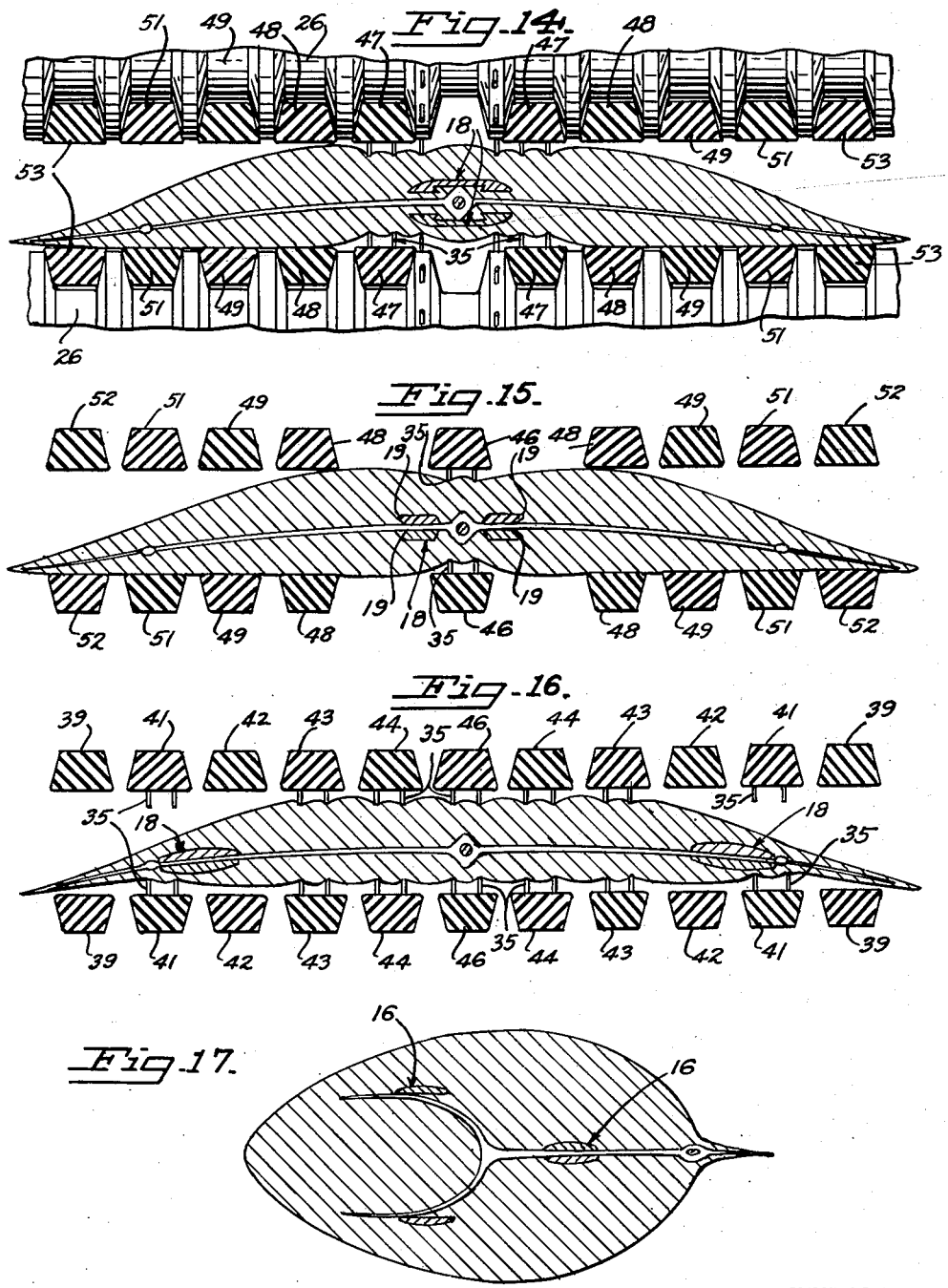
INVENTORS
ALEX GRADOFF
KENNETH W. HOWELL
BY IVAN VINOFF
ATTORNEY

United States Patent Office 2,822,569
Patented Feb. 11, 1958

2,822,569

FISH FILLETING MACHINE

Alex Gradoff, Kenneth W. Howell, and Ivan Vinoff, San Francisco, Calif., assignors of three percent to Clarence Terry, two percent to Fred A. Mead, Jr., one percent to Harry King, one percent to Curtis Penrod, one percent to Clarence Brown, one percent to James R. Townsend, one-half percent to Leslie Musante, and one-half percent to Marjorie West Application November 8, 1954, Serial No. 467,327

14 Claims. (Cl. 17—4)

This invention relates to a fish filleting machine.

The primary object of this invention is to provide a fish filleting machine and particularly to provide a highly efficient and smooth operating machine wherein the fish are positively guided and carried longitudinally along a pair of blades in such a manner that the fillets or meat portions are peeled off the skeleton of a fish efficiently.

Among the novel features of the herein fish filleting machine are the parallel filleting blades, each being generally V-shaped with an elongated apex point hollow in the center and with edges so slanted as to easily separate the meat from the bones of a fish; the supporting of the V-shaped blades at their wider ends so that the same can be pushed apart resiliently and spacing the elongated points apart to facilitate the entry of the bone of the fish therebetween; the arrangement of a plurality of comparatively narrow parallel conveyors in a series transverse to the blades for mutual driving interconnection between the rollers of such conveyors, and the supporting of the same on individual resiliently adjustable supports so as to permit self-adjustment according to the size of the fish, providing barbs or prongs on the respective conveyors for engaging the skin of the fish without tearing the the same so as to pull the fish longitudinally past the respective blades, the said conveyors being parallel with and outside of the respective separable blades; the provision for the cleaning of the end rollers of the conveyors, and easy adjustment for opening the entrance end of the conveyor for the insertion of the fish.

We are aware that some changes may be made in the general arrangements and combinations of the several devices and parts, as well as in the details of the construction thereof without departing from the scope of the present invention as set forth in the following specification, and as defined in the following claims; hence we do not limit our invention to the exact arrangements and combinations of the said device and parts as described in the said specification, nor do we confine ourselves to the exact details of the construction of the said parts as illustrated in the accompanying drawings.

With the foregoing and other objects in view which will be made manifest in the following detailed description, reference is had to the accompanying drawings for the illustrative embodiment of the invention, wherein:

Fig. 3 is a fragmental plan view of the lower half of the machine.

Fig. 4 is a fragmental plan view of the blade.

Fig. 5 is a fragmental side view of the lower blade and one roller.

Fig. 6 is a fragmental plan view of a belt with the barb or prong thereon.

Fig. 7 is a cross sectional view of a barbed belt.

Fig. 8 is a fragmental sectional view of a barbed belt.

Fig. 11 is a cross-sectional view at about the entrance rollers of the machine.

Fig. 12 is a fragmental sectional view showing the centering device and the adjustable support for the entrance rollers.

Fig. 13 is a fragmental front elevation of the entrance end of the machine showing the resilient centering device.

Fig. 14 is a diagrammatic sectional view showing the relation of the fish to the conveyor belts at about the piercing points of the blade.

Fig. 15 is a diagrammatic sectional view showing the relation of the fish at about the slots of the blade points.

Fig. 16 is a diagrammatic sectional view of the fish and the belts at about the last roller of the series.

Fig. 17 is a diagrammatic sectional view illustrating the relative resiliency of the branches of the blades to conform to non-symmetrical bone structure of fish.

Figure 1:
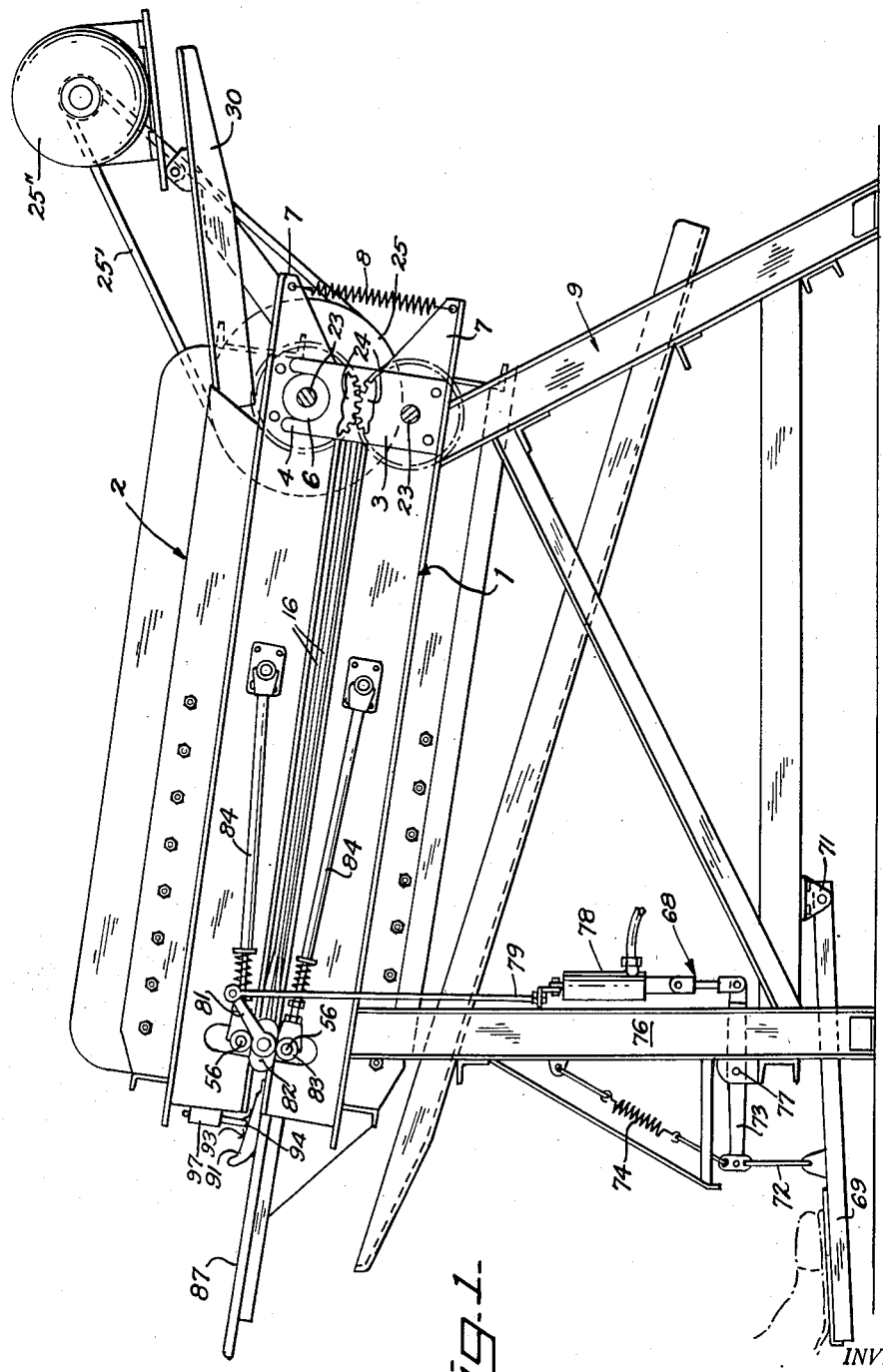
Fig. 1 is a side view of the entire assembly of the fish filleting machine.

In carrying out our invention we make use of a lower housing or shell 1 and an upper housing or shell 2 connected at their outlet ends hingedly so that the upper shell can be separated from the lower shell and swung into an open position. For this purpose on each side of the outlet end of the lower shell 1 is provided a bracket 3 with a fork bearing 4 at its top in which is nested a pivot 6 extended from the side of the upper shell 2. From the outlet end of each shell 1 and 2 extend a pair of projections 7 and the projections of each pair are connected by a coil spring 8 for the purpose of counterbalancing the weight of the upper shell 2 about the pivot bearings 4 and thereby to facilitate the swinging of the upper shell 2 about its pivot.

The lower shell 1 is supported on any suitable understructure such as the supporting frame or legs generally designated by the reference numeral 9.

Each housing or shell 1 and 2 has a pair of spaced longitudinal sides 10. The construction of each side 10 in the present illustration, as shown in Fig. 11, includes an angle iron forming the outer strip 11 of each side 10 and a middle strip or channel 12 fixed to the horizontal flange 13 of the angle strips 11. The horizontal flanges 13 of the angle strip 11 project outwardly and the inner channel 12 is secured by welding along the outer edge portion of the horizontal flange 13 so as to face outwardly of the shell and to define a pocket or recess along the middle of the device. The free edge or flange 14 of each channel 12 forms the longitudinal edge of the respective shells 1 or 2.

On the longitudinal edges or flanges 14 of each shell is mounted a knife or blade 16. Each blade 16 is generally V-shaped suitably anchored at its wider end on a plate 17 on the respective flange 14. The respective legs or branches of the V-shaped blade 16 converge from said anchored ends toward an apex 18 which latter is elongated to form generally parallel spaced edges 19 terminating in a tapered point 21. Thus a generally hollow blade is formed in which there is a solid point 21 behind which is a longitudinal slot 22 between the parallel blade edges 19, then a widening diverging space between the diverging rear portions or legs of each V-shaped blade 16. As particularly shown in Fig. 2, the elongated apices of the opposite blades 16 are bent outwardly from one another in such a way as to diverge from one another toward the respective tips 21. In this manner the tips 21 of the blades are spaced apart and facilitate the entrance of the bone structure of a fish between the blades. The blades 16 are resilient so that they may yield in accordance with the size of the bone structure of a fish, yet firmly hold against the portions of the fish for guiding and holding the same.

In the outlet end of each casing is journalled a pulley 22 by means of shafts 23 extended from the opposite ends thereof. Each shaft 23 at one end of the pulley 22 extends through the respective upper and lower shells 1 and 2 and have thereon transmission gears 24 which transmission gears transmit rotation from one shaft 23 to the other. The transmission gears 24 rotate in opposite direction to one another which causes the adjacent or middle branches of suitable V-belts, to be hereinafter described, to move parallel in the same direction, namely toward the outlet end. The outer shaft 23 of the upper pulley 22 is connected to a drive pulley 25 and is driven by a belt 25' from a suitable transmission of an electric motor 25" mounted on a bracket 30 extended from the upper shell 2. As the shells 1 and 2 are separated and the upper shell 2 is raised around its pivot, the transmission gears 24 are allowed to freely compensate for the relative movement of the shells during the opening thereof.

In each shell 1 and 2 there are a series of roller pulleys hereinafter referred to as rollers, arranged in series symmetrically therefore, the description of the same in shell 1 will suffice.

Roller 26 is the entrance roller and is extended about one-half of its diameter in advance of the blade point 21. The series of rollers 27, 28, 29, 30, 31, 32 and 33 are arranged in series following the entrance roller 26 toward the outlet end and are being so spaced and of such dimensions that the last roller 33 of the series is generally intermediate between the anchored ends and the point of the blade 16. Each of the rollers is substantially equal in length to the effective distance between the widest cutting edges of the branches of the blades 16. The rollers 26 to 33 are supported on suitable yieldable bearings to be hereinafter described. The driving of the rollers is accomplished by a series of V-belts whereby the driving pulley 22 is connected to certain of the rollers as well as the respective rollers of the series are connected to one another for balanced driving and generally balanced pulling of the fish along and against the cutting edges of the respective blades 16.

For the purpose of engaging the fish and pulling it on a path parallel with the blades 16 certain of the V-belts are provided with barbs or prongs 35 in such a way that the same engage the skin of the fish without deeply penetrating or tearing the same. This structure as shown in Figs. 6, 7 and 8, is formed in this case by a U-shaped wire 34 penetrating from the inside of the V-belt outwardly to the top of the V-belt and then horizontally along the upper surface of the V-belt and then bent upwardly and curved in the direction of movement of the V-belt so as to grab the skin of the fish and pull the fish. Certain of the V-belts are smooth and have no such prongs formed thereon.

For the purpose of balanced driving the drive rollers 22 as well as the other rollers 26 to 33 are provided each with a plurality of circular grooves 36 for the respective V-belts and either driving therethrough or be driven thereby as hereinafter described.

The grooves 36 on the rollers and the drive pulley are in registry with one another so that the respective V-belts extending in the registering grooves are parallel. The outermost drive belts 37 on the pulley 22 extend to the roller 29 which is the fourth in series from the entrance roller 26. These first driving belts 37 have thereon the prongs 35 for pulling the fish. The next inside driving belts 38 are smooth belts without prongs and extend from the driving pulley 22 to the second roller 27 next to the entrance roller 26 in the series. The next pair of driving belts 39 are also smooth belts without pulling prongs and extend from the driving pulley 22 to the roller 30 which is fifth in series from the entrance roller 26.

The next pair of belts 41 are belts with prongs 35 to pull the fish and extend from the drive pulley 22 to the roller 33 which is the last of the series of rollers and so that these fish pulling belts are in the space between the branches of the V-shaped blade 16. The next pair of belts 42 are smooth belts which extend from the drive pulley 22 to the roller 32 which is next to the last of the series of rollers. The next pair of belts 43 are belts with prongs 35 and extend from the drive pulley 22 to and around the roller 31 which is the sixth in the series from the entrance roller 26. The next pair of belts 44 are pronged and extend from the drive pulley 22 to the roller 28, the third of the series. The central belt 46 is also pronged and extends from the drive roller 22 to the roller 27 which is the next to the entrance roller 26.

There is also a system of balanced belts interconnecting the series of rollers 26 to 33 with one another. A pair of barbed or pronged belts 47 extend on each side of the central belt 46 from the second roller 27 to and around the entrance roller 26 in order to pull the fish up to and against the points of the blades 16. Immediately adjacent and outside of this pair of belts 47 are a pair of smooth belts 48 which extend between the entrance roller 26 and the roller 30 which is the fifth roller from the entrance roller 26. The next outside pair of smooth belts 49 extend between the entrance roller 26 and the next roller 31, namely the sixth roller in the series from the entrance roller 26. The pair of smooth belts 51 immediately outside of the belts 49 extend between the entrance roller 26 and the seventh roller 32. The next outside pair of smooth belts 52 extend between the entrance roller 26 and the fourth roller 29. On the outside on each side of the drive belts 38 heretofore described are smooth belts 53 which extend between the entrance roller 26 and the third roller 28. Finally the outside smooth belts 54 which extend between the entrance roller 26 and the last roller 33 of the series. Thus smooth driving and transmission along the width of the respective rollers is accomplished for even driving and pull and the arrangements of the pronged belts is such that even pull is exerted on various portions of the fish as they reach the respective belts. Except for the central entrance belts 47 the other interconnecting belts between the series of rollers are smooth.

The mounting of the entrance roller 26 and the other rollers of the series are accomplished in such a manner as to allow the rollers to yield readily in accordance with the thickness of the fish between them and thereby exert constant but yielding pressure upon the fish and facilitate its uniform advance along the respective blades 16.

Figure 2:
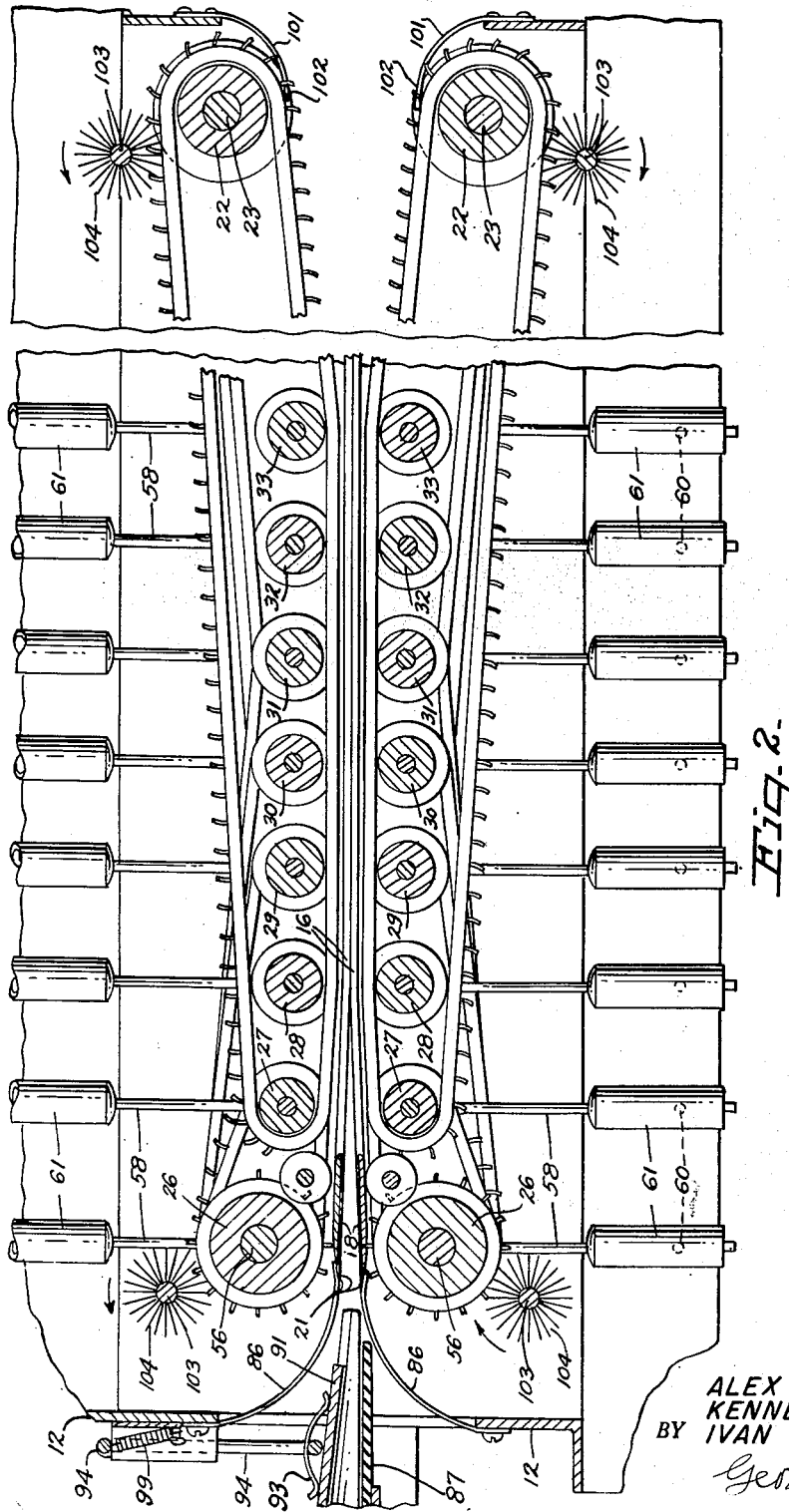
Fig. 2 is a somewhat diagrammatic view showing the mounting of the conveyor rollers and their general arrangement in the respective casing.
Figures 9, 10:
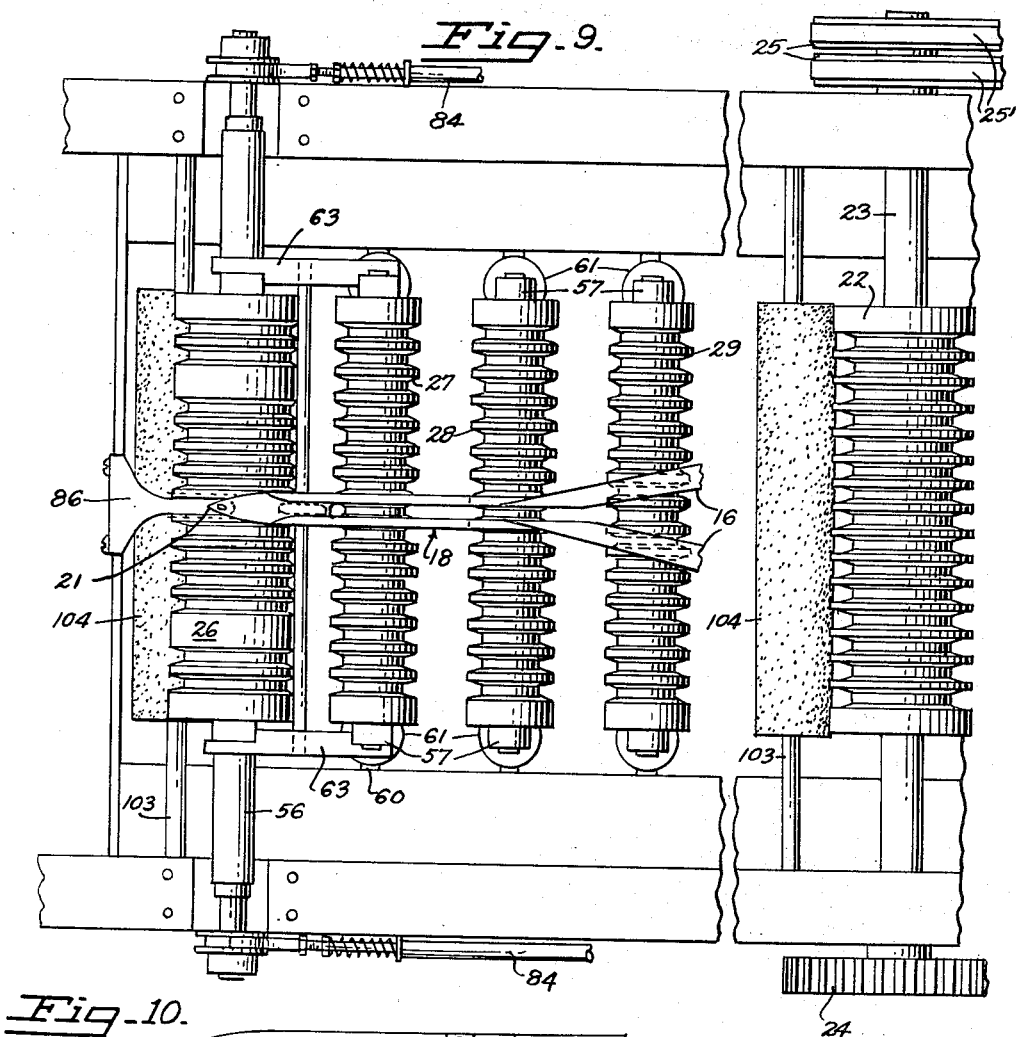
Fig. 9 is a fragmental plan view of the lower half of the machine on a larger scale.
Fig. 10 is a fragmental plan view of the entrance end on the lower half of the machine.

In the herein illustration and particularly as shown in Figs. 2 and 11, each of the rollers 26 to 33 has on each end a stub shaft 56 which stub shaft is journalled as shown in Fig. 11 in a journal block 57. This journal block 57 has a rod 58 radially extended therefrom. On each rod 58 is a plunger washer 59 located in a pivoted cylinder 61. A coil spring 62 inside of each cylinder 61 bears against the plunger washer 59 so as to normally urge the washer 59 inwardly of the machine thereby to urge the journal blocks 57 and the respective opposite rollers toward one another. Thus the respective opposite rollers can be pushed apart against the actions of the coil springs 62 and yield to accommodate the bulge or size of the fish. Each cylinder 61 is suitably mounted on the adjacent outer, or top or bottom strips 11 of the respective shells 1 and 2 on a pivot 60. Thus the rollers are yieldably connected to their respective shells or casings.

At the entrance end of the device the entrance rollers 26 are pivotally connected to the stub shafts 56 of the e engaged by other conveyor belts toward the outside ends of the respective rollers. The fish usually is thicker in the middle and tapers toward the side fins and the general shape determines more or less the shape and weight of the fish. Accordingly an arrangement is provided whereby the engagement and gripping or pulling of the fish is generally proportioned to the size of the fish allowing great flexibility of operation and more gentle action on the fillets of the fish without tearing the same. As illustrated in Fig. 17, if the structure of the fish is bulky, as shown in cross-section, the resiliency of the blades 16 permits them to be pushed apart by the bone structure so as to peel along the bones and fillet all the meat.

As shown in Figs. 4 and 14 the point 21 of each blade 16 is undercut on the face facing the other point 21 so as to form a recess 106 generally in continuation of the slot 22 of the elongated point. The upright edges of this recess are slanted and sharp to prevent the backbone to slide laterally between the blade points. A projection or bead 107 at the tip of each blade point 21 facing toward the opposite point serves to abut against the bone structure of the fish so as to raise the points slightly away from the contacted bone thereby to prevent the points to penetrate into the contacted bone yet peel very closely to it. The diverging cutting edges 16' of each blade 16 begin at the edge of the slot 22 above the elongated point 18, as shown in Fig. 4, and then diverge outwardly as shown. Thus the peeling action begins immediately next to the backbone of the fish and then continues out toward the dorsal fins, as shown in Figs. 14 to 16 inclusive.

We claim:

1. In a fish filleting machine, a pair of complemental hollow casings, a filleting blade on each casing extending longitudinally of the casings generally along the plane where the casings meet, said casings forming an inlet at one end and an outlet at the other end thereof, filleting edges on each blade converging toward said inlet, a piercing point at the convergence of said filleting edges pointing toward said inlet, and conveyor means in said casing parallel with and adjacent to the respective blades being adapted to move said fish against said piercing points and then along said blades, each blade including a pair of resilient legs diverging from said point toward said outlet, said filleting edges being formed on the outer edges of said legs, means to anchor the ends of said legs on the adjacent casing so that said blades yieldably conform to the bone structure of the fish pulled along the blades, each piercing point being elongated and having a longitudinal slot therethrough open to the space between said legs.

2. In a fish filleting machine, a pair of complemental hollow casings, a filleting blade on each casing extending longitudinally of the casings generally along the plane where the casings meet, said casings forming an inlet at one end and an outlet at the other end thereof, filleting edges on each blade converging toward said inlet, a piercing point at the convergence of said filleting edges pointing toward said inlet, and conveyor means in said casing parallel with and adjacent to the respective blades being adapted to move said fish against said piercing points and then along said blades, each blade including a pair of resilient legs diverging from said point toward said outlet, said filleting edges being formed on the outer edges of said legs, means to anchor the ends of said legs on the adjacent casing so that said blades yieldably conform to the bone structure of the fish pulled along the blades, each piercing point being elongated and having a longitudinal slot therethrough open to the space between said legs, side peeling edges on opposite edges of each elongated point, the portions of said blades adjacent said piercing points being curved and flared from one another so as to form a flaring wider space between opposite piercing points of said blades.

3. In a fish filleting machine, a pair of complemental hollow casings, a filleting blade on each casing extending longitudinally of the casings generally along the plane where the casings meet, said casings forming an inlet at one end and an outlet at the other end thereof, filleting edges on each blade converging toward said inlet, a piercing point at the convergence of said filleting edges pointing toward said inlet, and conveyor means in said casing parallel with and adjacent to the respective blades being adapted to move said fish against said piercing points and then along said blades, each blade including a pair of resilient legs diverging from said point toward said outlet, said filleting edges being formed on the outer edges of said legs, means to anchor the ends of said legs on the adjacent casing so that said blades yieldably conform to the bone structure of the fish pulled along the blades, each piercing point being elongated and having a longitudinal slot therethrough open to the space between said legs, side peeling edges on opposite edges of each elongated point, the portions of said blades adjacent said piercing points being curved and flared from one another so as to form a flaring wider space between opposite piercing points of said blades, each filleting edge being beveled for peeling the meat off the bones.

4. In a fish filleting machine, a pair of complemental hollow casings, a filleting blade on each casing extending longitudinally of the casings generally along the plane where the casings meet, said casings forming an inlet at one end and an outlet at the other end thereof, filleting edges on each blade converging toward said inlet, a piercing point at the convergence of said filleting edges pointing toward said inlet, and conveyor means in said casing parallel with and adjacent to the respective blades being adapted to move said fish against said piercing points and then along said blades, said conveyor means including a series of rollers transversely journalled in each casing near the inlet of the casing and being parallel with and adjacent to the nearest blade, a drive pulley near the outlet of each casing, a plurality of belts drivingly connecting said drive pulley to said series of rollers, and a plurality of belts interconnecting the rollers in each series, barbs on certain of said belts adapted to engage the skin of the fish for pulling the fish past said blades.

5. In a fish filleting machine, a pair of complemental hollow casings, a filleting blade on each casing extending longitudinally of the casings generally along the plane where the casings meet, said casings forming an inlet at one end and an outlet at the other end thereof, filleting edges on each blade converging toward said inlet, a piercing point at the convergence of said filleting edges pointing toward said inlet having a longitudinal slot therethrough, and conveyor means in said casing parallel with and adjacent to the respective blades being adapted to move said fish against said piercing points and then along said blades, said conveyor means including a series of rollers transversely journalled in each casing near the inlet of the casing and being parallel with and adjacent to the nearest blade, a drive pulley near the outlet of each casing, a plurality of belts drivingly connecting said drive pulley to said series of rollers, and a plurality of belts interconnecting the rollers in each series, barbs on certain of said belts adapted to engage the skin of the fish for pulling the fish past said blades, a central barbed belt of each conveyor means extending from about the adjacent piercing point along said slot to the drive pulley.

6. In a fish filleting machine, a pair of complemental hollow casings, a filleting blade on each casing extending longitudinally of the casings generally along the plane where the casings meet, said casings forming an inlet at one end and an outlet at the other end thereof, filleting edges on each blade converging toward said inlet, a piercing point at the convergence of said filleting edges point-adjacent second roller 27 of the series, by yoke links 63. Each yoke link 63 is journalled at the end of the stub shaft 56 of the second roller 27 and has its other end bifurcated so as to form a yoke around a bearing shaft 56 of the entrance roller 26, so as to allow the separation or pushing apart of the opposite entrance rollers 26 relatively to the next rollers of the series. The bearing shaft 56 of each entrance roller 26 extends through a hole 67 through the respective shells 1 or 2 for suitable connection with a control or manipulating mechanism for normally holding the entrance rollers apart and allowing them to press together each time a fish is introduced between them. This control mechanism is denoted in its entirety by the numeral 68 in Fig. 1.

The control or manipulating mechanism 68 may be electronic, pneumatic or footpedal control as particularly shown in Fig. 1, where it includes a foot pedal 69 pivoted at its inner end on a fixed bracket 71 and connected by a link 72, generally intermediate its ends, to an actuating lever 73. A coil spring 74 connected between the link 72 and the fixed frame member 76 normally pulls the link 72 and pedal 69 upwardly. The lever 73 is journalled in a bearing 77 on the frame member 76 intermediate its ends, and its free end is connected to suitable pneumatic actuator generally designated by numeral 78. This actuator 78 is adapted to move a rod 79 along the frame member 76. The top of the rod 79 is connected to an arm 81 of an eccentric cam 82. The eccentric cam 82 is located between a pair of bearing guards 83 mounted on the ends of resiliently telescoping tension rods 84. Each of the tension rods 84 is journalled on the outside of the respective casing 1 or 2 and is connected to the outer end of the adjacent bearing shaft 56 to support the same swingably, and push it toward the front of the case so as to keep the belts under tension. The eccentric cam 82 is between bearing guards 83 so that when the foot pedal 69 is pushed down, it pushes the actuator 78 up which in turn will push the rod 79 up so that the eccentric cam 82 on each side will permit the pressing together of the entrance rollers 26 to firmly grasp and engage the tail of the fish. Then the pedal is released and the eccentric cam 82 is returned to its initial position to hold the entrance rollers 26 apart ready for the next fish.

The point of each blade is bent or curved outwardly with respect to the opposite blade so that the points diverge from one another, to accommodate the tail portions of various sizes of fish therebetween. In order to guide the tail of the fish suitably and directly between the points of the blades 16, a pair of light spring guides 86 are provided one in each casing to work from the outer end of the casing inwardly to the points of the respective blades 16. The guides 86 substantially taper toward the respective blade points as shown in Fig. 3 and are spread apart by the body of the fish.

At the entrance end of the machine there is provided a receiving plate 87 made preferably of suitable rubber or plastic composition so molded that it has corrugations 88 thereon. The corrugations are arranged so as to slant in opposite direction on opposite halves of the plate 87 and converge and meet at the longitudinal center line of the plate 87. The fish placed upon and advanced toward the entrance conveyors 26 are placed upon this plate 87 which is inclined downwardly as shown in Fig. 1. The center line of the plate 87 is generally in alignment with the center line of the machine.

It is to be noted that for best efficiency the casings are also inclined downwardly toward the outlet end of the machine thereby to allow flow of fluids toward the outlet end and also take advantage, to a certain extent, of gravity.

For more accurately centering the fish there is provided hollow hood 91 above the entrance or receiving plate 87. The hood, as particularly shown in Figs. 12 and 13, has an entrance end 92 which is inclined and curved away from the plate 87 to facilitate the insertion of the fish preferably tail first. Then the hollow part of the hood converges downwardly and inwardly of the machine above the plate 87 so as to more definitely guide the fish in its advance toward the blade points. On the top of the hood is a bow spring 93 for resiliently pressing the hood 91 downwardly. The bow spring 93 is supported on a horizontal bar which forms part of a generally rectangular yoke 94 the vertical sides of which yoke are slidable in guide sleeves 97. The guide sleeves 97 are suitably mounted on the front wall of the top casing 1, for instance by flanges 98 screwed on said front wall. A coil spring 99 is anchored at its lower end at the flange 98 and has its other end connected to the top horizontal member of the yoke 94 as shown in Figs. 12 and 13 so as to normally urge the yoke and the bow spring 93 thereon against the top of the hood 91. As the fish is inserted, it pushes the hood 91 upwardly according to its size and after the initial resiliency of the bow spring 93 is utilized the assembly can be pushed further up against the action of the coil spring 99 thus accommodating and centering fish of various sizes.

At the outlet end of the machine particularly as shown in Fig. 3, above the respective drive pulleys 22 are a pair of fixed scraper combs 101. The drive pulleys 22 are spaced apart further than the other rollers so that the conveyor belts diverge from one another toward the outlet ends of the casings. The space between the drive pulleys is open for the ejection of the fillets of the fish as well as the bone.

Each scraper comb 101, as particularly shown in Fig. 3, has a plurality of teeth pointing toward the direction from which the fish approaches on the belts. The teeth 102 are generally above the respective conveyor belts so that the fillet or any part thereof is prevented from going around with the belts but it is stripped off the belts and drops out alongside the curved body of the guide comb 101.

Above the return side of each entrance roller 26 and also above each drive pulley 22 is provided, on a crossshaft 103 journalled in the respective shell or casing, a circular brush 104 which is driven by suitable transmissions not shown in the same direction as the adjacent roller or pulley. The brushes rotate oppositely to the direction of movement of the conveyor belts adjacent to them so as to clean and brush the respective conveyor belts before they turn around the entrance rollers 26 and after they left the drive pulley 22, thereby to assure clean unobstructed operation of the belts both for driving and also for conveying the fish along the respective blades 16.

In operation the fish is inserted in the present machine manually, although suitable devices may be provided for placing the fish and feeding by mechanical means. The fish is pushed under the hood 91 until it is grabbed and engaged by the first barbed front conveyor belts 47, as the entrance rollers are released and move together. The fish is thus pulled tail-first against the piercing points of the blades 16 and along the same as shown in Fig. 14. As the fish is passed along the elongated blade points the central barbed belts 46 engage the fish through the slots of the points, as shown on Fig. 15.

Thereafter the other barbed conveyors impress their prongs into the fish without tearing the same but with firmness and by the curved prongs or barbs advance the fish forcefully against the edges of the blades 16. The pressures on the sides of the fish are so balanced as to keep the central bone structure of the fish between the blades 16. As the fish is fully advanced over and parallel with the blades 16, other barbed belts engage the fish as shown in Fig. 16 according to the thickness and the size of the fish. In this manner the gripping of the fish on its advancement is proportioned generally to the bulk of the fish. Smaller fish will be engaged by certain of the conveyor belts nearer the middle and larger fish will ing toward said inlet, and conveyor means in said casing parallel with and adjacent to the respective blades being adapted to move said fish against said piercing points and then along said blades, said conveyor means including a series of rollers transversely journalled in each casing near the inlet of the casing and being parallel with and adjacent to the nearest blade, a drive pulley near the outlet of each casing, a plurality of belts drivingly connecting said drive pulley to said series of rollers, and a plurality of belts interconnecting the rollers in each series, barbs on certain of said belts adapted to engage the skin of the fish for pulling the fish past said blades, a central barbed belt of each conveyor means extending from about the adjacent piercing point along said blade to the drive pulley, a barbed belt in each conveyor means spaced next to each side of said center barbed belt and extending over the rollers from said intake to about said point of convergence of the blade bars.

7. In a fish filleting machine, a pair of complemental hollow casings, a filleting blade on each casing extending longitudinally of the casings generally along the plane where the casings meet, said casings forming an inlet at one end and an outlet at the other end thereof, filleting edges on each blade converging toward said inlet, a piercing point at the convergence of said filleting edges pointing toward said inlet, and conveyor means in said casing parallel with and adjacent to the respective blades being adapted to move said fish against said piercing points and then along said blades, said conveyor means including a series of rollers transversely journalled in each casing near the inlet of the casing and being parallel with and adjacent to the nearest blade, a drive pulley near the outlet of each casing, a plurality of belts drivingly connecting said drive pulley to said series of rollers, and a plurality of belts interconnecting the rollers in each series, barbs on certain of said belts adapted to engage the skin of the fish for pulling the fish past said blades, a central barbed belt of each conveyor means extending from about the adjacent piercing point along said blade to the drive pulley, a barbed belt in each conveyor means spaced next to each side of said center barbed belt and extending over the rollers from said intake to about said point of convergence of the blade bars, and other spaced belts having barbs at different spaced distances from the center belt to engage the fish symmetrically according to its size.

8. In a fish filleting machine, a pair of complemental hollow casings, a filleting blade on each casing extending longitudinally of the casings generally along the plane where the casings meet, said casings forming an inlet at one end and an outlet at the other end thereof, filleting edges on each blade converging toward said inlet, a piercing point at the convergence of said filleting edges pointing toward said inlet, and conveyor means in said casing parallel with and adjacent to the respective blades being adapted to move said fish against said piercing points and then along said blades, said conveyor means including a series of rollers transversely journalled in each casing near the inlet of the casing and being parallel with and adjacent to the nearest blade, a drive pulley near the outlet of each casing, a plurality of belts drivingly connecting said drive pulley to said series of rollers, and a plurality of belts interconnecting the rollers in each series, barbs on certain of said belts adapted to engage the skin of the fish for pulling the fish past said blades, a central barbed belt of each conveyor means extending from about the adjacent piercing point along said blade to the drive pulley, a barbed belt in each conveyor means spaced next to each side of said center barbed belt and extending over the rollers from said intake to about said point of convergence of the blade bars, and other spaced belts having barbs at different spaced distances from the center belt to engage the fish symmetrically according to its size, and means to support each of said rollers individually resiliently yieldably in its casing so as to normally urge said belts toward said blades and the fish between said belts.

9. In a fish filleting machine, a pair of complemental hollow casings, a filleting blade on each casing extending longitudinally of the casings generally along the plane where the casings meet, said casings forming an inlet at one end and an outlet at the other end thereof, filleting edges on each blade converging toward said inlet, a piercing point at the convergence of said filleting edges pointing toward said inlet, and conveyor means in said casing parallel with and adjacent to the respective blades being adapted to move said fish against said piercing points and then along said blades, said conveyor means including a series of rollers transversely journalled in each casing near the inlet of the casing and being parallel with and adjacent to the nearest blade, a drive pulley near the outlet of each casing, a plurality of belts drivingly connecting said drive pulley to said series of rollers, and a plurality of belts interconnecting the rollers in each series, barbs on certain of said belts adapted to engage the skin of the fish for pulling the fish past said blades, a central barbed belt of each conveyor means extending from about the adjacent piercing point along said blade to the drive pulley, a barbed belt in each conveyor means spaced next to each side of said center barbed belt and extending over the rollers from said intake to about said point of convergence of the blade bars, and other spaced belts having barbs at different spaced distances from the center belt to engage the fish symmetrically according to its size, and means to support each of said rollers individually resiliently yieldably in its casing so as to normally urge said belts toward said blades and the fish between said belts, said drive pulleys near the outlet being spaced apart wider than said rollers so as to leave space for ejecting the fish from between said belts.

10. In a fish filleting machine, a pair of superimposed blades arranged in generally parallel planes, outer cutting edges of each blade converging to an apex generally in said respective planes, a piercing point formed at each apex, and fish conveyor means moving on a path generally with and along the planes of the respective blades and oppositely to the direction of said points to convey fish against and unto said piercing points and then along said blades, said cutting edges on each of said blades diverging generally in said plane from said respective points at least to the width of said conveyor means so as to peel the fillets from the opposite sides of the bone structure of said fish, said conveyor means including V belts, spaced claw elements formed on certain of said belts, each claw element including a pair of fingers extended outwardly from the belt being curved to point in the direction of travel of the respective belt.

11. In a fish filleting machine, a pair of superimposed blades arranged in generally parallel planes, outer cutting edges of each blade converging to an apex generally in said respective plane, a piercing point formed at each apex, and fish conveyor means moving on a path generally parallel with and along the planes of the respective blades and oppositely to the direction of said points to convey fish against and unto said piercing points and then along said blades, said cutting edges on each of said blades diverging generally in said plane from said respective points at least to the width of said conveyor means so as to peel the fillets from the opposite sides of the bone structure of said fish, said conveyor means including a plurality of parallel V belts, means to drive said belts, barbs on certain of said belts, each barb being formed of a U shaped wire extended through the belt transversely of the belt, the legs of said wire being curved to extend along the top of the belt and then to project generally perpendicularly of said belt, each point thereof being curved toward the direction of the belt travel.

12. In a fish filleting machine, a pair of superimposed blades arranged in generally parallel planes, outer cutting edges of each blade converging to an apex generalin said respective planes, a piercing point formed at th apex, and fish conveyor means moving on a path lerally parallel with and along the planes of the respec- e blades and oppositely to the direction of said points convey fish against and unto said piercing points and n along said blades, said cutting edges on each of d blades diverging generally in said plane from said pective points at least to the width of said conveyor ans so as to peel the fillets from the opposite sides of bone structure of said fish, each of said blades includ- a pair of elements arranged generally in V-shape in lane parallel with the path of the fish on said conveyor ans, the apex of said V-shape forming said piercing nt and facing in the direction from which the fish roaches said blades, a projection on the tip of each nt extended toward the opposite point for preventing points from penetrating into the bone of the fish.

13. In a fish filleting machine, a pair of complemental low casing, a filleting blade on each casing extending gitudinally of the casings generally along the plane ere the casings meet, said casings forming an inlet at e end and an outlet at the other end thereof, filleting es on each blade converging toward said inlet, a pierc- point at the convergence of said filleting edges point- toward said inlet, and conveyor means in said casing allel with an adjacent to the respective blades being ipted to move said fish against said piercing points and n along said blades, each blade including a pair of verging resilient legs, said filleting edges being formed the outer edges of said legs, means to anchor the free ls of said legs on the adjacent casing so that said blades ldably conform to the bone structure of the fish pulled ng the blades, each piercing point being elongated and ing a longitudinal slot therethrough open to the ce between said legs each point having a longitudinal ess in continuation of said slot toward the tip of the point for containing the bone of the fish against lateral movement between the points.

14. In a fish filleting machine, a pair of complemental hollow casings, a filleting blade on each casing extending longitudinally of the casings generally along the plane where the casings meet, said casings forming an inlet at one end and an outlet at the other end thereof, filleting edges on each blade converging toward said inlet, a piercing point at the convergence of said filleting edges pointing toward said inlet, and conveyor means in said casing parallel with an adjacent to the respective blades being adapted to move said fish against said piercing points and then along said blades, and means to guide and align the fish with said piercing points, said last means including an inlet surface ahead of the piercing point for supporting the fish fed toward said piercing points, a hollow hood above said surface, converging sides of said hood facing toward said surface to engage and guide the fish toward said piercing points, and yieldable support device for said hood to permit said hood to conform to the size and shape of the fish fed toward said piercing points.

References Cited in the file of this patent

UNITED STATES PATENTS

| | | |
|---|---|---|
| 2,031,856 | Rowton et al. | Feb. 25, 1936 |
| 2,292,696 | Jensen | Aug. 11, 1942 |
| 2,466,614 | Rivers | Apr. 5, 1949 |
| 2,612,652 | Berglund | Oct. 7, 1952 |
| 2,659,930 | Jagger | Nov. 24, 1953 |
| 2,669,269 | Schmidt | Feb. 16, 1954 |
| 2,714,221 | Gradoff et al. | Aug. 2, 1955 |

FOREIGN PATENTS

| | | |
|---|---|---|
| 250,784 | Italy | Nov. 11, 1926 |